United States Patent
Oliver et al.

(10) Patent No.: US 8,156,371 B2
(45) Date of Patent: Apr. 10, 2012

(54) CLOCK AND RESET SYNCHRONIZATION OF HIGH-INTEGRITY LOCKSTEP SELF-CHECKING PAIRS

(75) Inventors: Brett D. Oliver, Tampa, FL (US); Joseph Caltagirone, Tampa, FL (US); Christopher Brickner, St. Petersburg, FL (US)

(73) Assignee: Honeywell International Inc., Morristown, NJ (US)

( * ) Notice: Subject to any disclaimer, the term of this patent is extended or adjusted under 35 U.S.C. 154(b) by 311 days.

(21) Appl. No.: 12/485,581

(22) Filed: Jun. 16, 2009

(65) Prior Publication Data

US 2010/0318884 A1 Dec. 16, 2010

(51) Int. Cl.
*G06F 11/00* (2006.01)

(52) U.S. Cl. .......................................... 714/12; 714/11

(58) Field of Classification Search ...................... 714/12
See application file for complete search history.

(56) References Cited

U.S. PATENT DOCUMENTS

| | | | | |
|---|---|---|---|---|
| 5,048,022 A | * | 9/1991 | Bissett et al. | 714/763 |
| 5,434,997 A | * | 7/1995 | Landry et al. | 714/12 |
| 5,537,655 A | * | 7/1996 | Truong | 714/12 |
| 5,751,932 A | * | 5/1998 | Horst et al. | 714/12 |
| 6,065,135 A | * | 5/2000 | Marshall et al. | 714/11 |
| 6,233,702 B1 | * | 5/2001 | Horst et al. | 714/48 |
| 7,372,859 B2 | | 5/2008 | Hall et al. | |
| 7,475,284 B2 | * | 1/2009 | Koike | 714/12 |
| 2002/0026604 A1 | * | 2/2002 | Bissett et al. | 714/12 |
| 2002/0046365 A1 | | 4/2002 | Avizienis | |
| 2003/0204713 A1 | * | 10/2003 | Hales et al. | 713/1 |
| 2006/0116803 A1 | | 6/2006 | Armbruster et al. | |
| 2007/0067673 A1 | | 3/2007 | Avizienis | |
| 2007/0220367 A1 | | 9/2007 | Smith et al. | |

* cited by examiner

*Primary Examiner* — Scott Baderman
*Assistant Examiner* — Kamini Patel
(74) *Attorney, Agent, or Firm* — Fogg & Powers LLC

(57) ABSTRACT

An apparatus comprises first and second modules configured to operate in a lockstep mode and a reset mode. Each of the first and second modules is configured to asynchronously enter the reset mode when a parent reset signal is asserted at the respective each module. Each of the first and second modules is configured to, in response to the asserted parent reset signal being negated at the respective each module, indicate to the respective other module that the respective each module is ready to exit the reset mode and exit the reset mode when the respective other module has also indicated that the respective other module is ready to exit the reset mode.

20 Claims, 6 Drawing Sheets

CLOCK AND RESET SYNCHRONIZATION OF HIGH-INTEGRITY LOCKSTEP SELF-CHECKING PAIRS

GOVERNMENT LICENSE RIGHTS

This invention was made with Government support under Government Contract Number NNJ06TA25C awarded by NASA. The Government has certain rights in the invention.

BACKGROUND

One strategy for assuring integrity in high-integrity systems uses a "self-checking pair." A self-checking pair is a logical grouping of two devices, subsystems, or systems (generally referred to here as "modules") that perform the same operations and that cross-check each other in order to assure correct operation. As a result of the cross-checking performed in the self-checking pair, a single fault in one of the modules will be detected by its partner and an appropriate action can be taken to handle the fault and to assure that the fault does not propagate.

The most tightly coupled and detailed approach to implementing a self-checking pair uses strict cycle-for-cycle lockstep where each module operates off of the same clock and performs the same action on each clock cycle. In this way all results, outputs, and operations can be checked on each clock cycle. Some challenges that can arise with such a strict cycle-for-cycle lockstep approach include the synchronization of the local clock in each of the modules with the primary clock, the generation of internal clocking resources at each module that are derived from the primary clock, and alignment of the internal clocking resources between the modules, and the generation, assertion, and negation of resets at both modules in lockstep.

In typical implementations, both modules of such a self-checking pair are provided with a primary clock signal from the same external clocking source and exchange all parent and derivative clock signals and reset signals in order to establish and maintain lock step alignment. This can result in module designs in which a large number of pins are dedicated to the exchange of such signals, which does not scale well with larger module designs having high numbers of internal clock and reset domains.

SUMMARY

In one embodiment, an apparatus comprises first and second modules configured to operate in a lockstep mode and a reset mode. Each of the first and second modules is configured to asynchronously enter the reset mode when a parent reset signal is asserted at the respective each module. Each of the first and second modules is configured to, in response to the asserted parent reset signal being negated at the respective each module, indicate to the respective other module that the respective each module is ready to exit the reset mode and exit the reset mode when the respective other module has also indicated that the respective other module is ready to exit the reset mode.

In another embodiment, a first module comprises application-specific functionality and clock and reset functionality configured to selectively cause the first module to operate in a lockstep mode in which the first module operates in lockstep with a second module and to selectively cause the first module to operate in a reset mode. The clock and reset functionality is configured to cause the first module to asynchronously enter the reset mode when a parent reset signal is asserted at the first module. The clock and reset functionality is configured to cause the first module, in response to the asserted parent reset signal being negated at the first module, to indicate to the second module that the first module is ready to exit the reset mode and to exit the reset mode when the second module has also indicated that the second module is ready to exit the reset mode.

Another embodiment is directed to a method of resetting first and second modules that are configured to selectively operate in a lockstep mode and a reset mode. The method comprises, at each of the first and second modules, asynchronously entering the reset mode when a parent reset signal is asserted at the respective each module and, in response to the asserted parent reset signal being negated at the respective each module, indicating to the respective other module that the respective each module is ready to exit reset mode and exiting the reset mode when the respective other module has also indicated that the respective other module is ready to exit reset mode.

The details of various embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
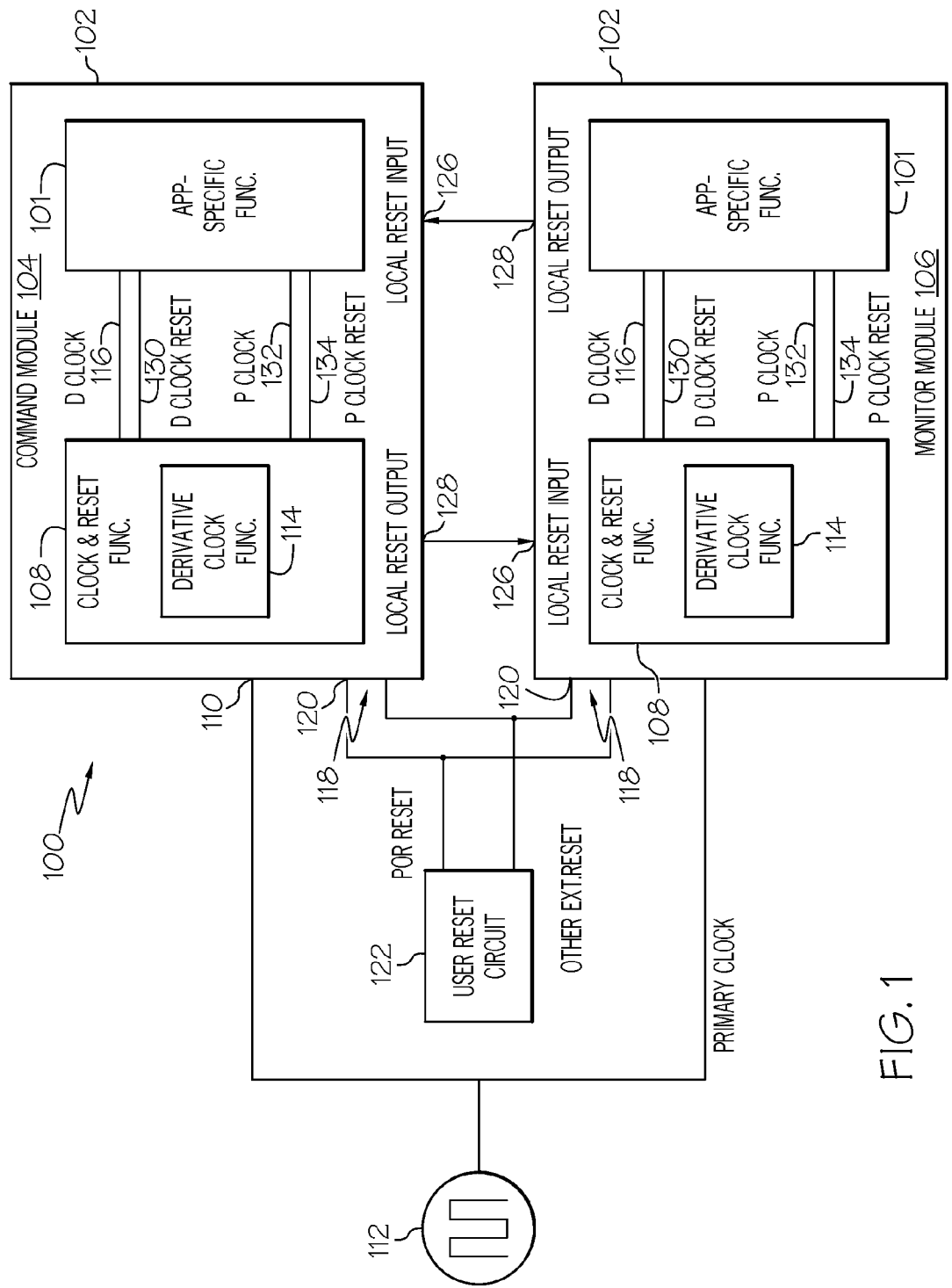
FIG. 1 is a block diagram of one embodiment of a self-checking pair.

FIG. 1 is a block diagram of one embodiment of a self-checking pair 100. The self-checking pair 100 comprises two modules 102. Examples of modules 102 include application-specific integrated circuits (ASICs), microprocessors, other programmable devices, computers, network interfaces, bus guardians, nodes, and other electronic circuits, modules, cards, or assemblies. In general, each of the modules 102 receive and process the same input such that if the same output is not generated for each relevant time period an error or failure is considered to have occurred in the self-checking pair 100.

Each module 102 includes some type of application-specific functionality 101 that implements one or more application-specific functions for which the self-checking pair 100 is designed.

In the particular embodiment shown in FIG. 1, a first one of the two modules 102 is designated as the "command" module 104 and a second one of the two modules 102 is designated as the "monitor" module 106. The monitor module 106 acts as a check on the processing performed by the command module 104. The monitor module 106 verifies the proper operation of command module 104 (for example, by comparing the output it has produced for the relevant time period with the corresponding output from the command module 104). If the output of the command module 104 and the output of the monitor module 106 differ, the monitor module 106 indicates that an error or fault has occurred in the self-checking pair 100. In other implementations and embodiments, other self-checking pair configurations are used.

Each of the modules 102 includes clock and reset functionality 108 and at least one clock input 110. A primary clock signal is received on the clock input 110. The primary clock signal is also referred to here as the "parent" clock signal. The clock and reset functionality 108 in each module 102 uses the received primary clock signal as a reference clock signal (the "P CLOCK" signal 132 in FIG. 1) and to generate any derivative clock signals that are used by that module 102 (for example, by the application-specific functionality 101). In the particular embodiment shown in FIG. 1, the clock input 110 of each of the modules 102 is directly coupled to an external clock source 112. In another embodiment, one of the modules 102 serves as a clock master with its clock input 110 directly coupled to an external clock source and the other one of the modules 102 receiving its primary clock signal from the module 102 that is acting as the clock master.

The clock and reset functionality 108 in each module 102 also includes derivative clock functionality 114 that is used to generate one or more derivative clock signals 116 (labeled "D CLOCK" in FIG. 1). The derivative clock functionality 114 in each module 102 is configured to align the one or more derivative clock signals 116 to the primary clock signal that is received on the clock input 110 of that module 102 and, when the module 102 is operating in lockstep mode, to the corresponding one or more derivative clock signals 116 produced in the other module 102 in the self-checking pair 100.

Each of the modules 102 has at least one external reset input 118 on which an external reset signal can be received. The external reset signal, when asserted, indicates that the self-checking pair 100 should reset itself. In the particular embodiment shown in FIG. 1, the external reset inputs 118 of each module 102 include a power on reset (POR) input 120 and at least one other external reset input 118. The system in which the self-checking pair 100 is deployed is configured to assert a reset signal on the POR input 120 when the system is powered on. Also, the system in which the self-checking pair 100 is deployed is configured so that a reset signal can be asserted on the other external reset input 118 in other situations after the system is powered on. In the particular embodiment shown in FIG. 1, a user reset circuit 122 included in the system in which the self-checking pair 100 is deployed generates the POR and external reset signals.

Also, in this embodiment, each of the modules 102 is configured to receive one or more internal reset signals from a source inside of the self-checking pair 100. The internal reset signal, when asserted, indicates that the self-checking pair 100 should reset itself.

The external reset signals and internal reset signals are also both referred to here as "parent" reset signals.

Each of the modules 102 also includes a local reset input 126 and a local reset output 128. As shown in FIG. 1, the local reset output 128 of each module 102 is cross-connected to the local reset input 126 of the other module 102.

The clock and reset functionality 108 in each of the modules 102 is configured to determine when a parent reset signal is asserted. When a parent reset signal is asserted, the module 102 asynchronously enters a reset mode.

The derivative clock functionality 114 in each module 102 is configured to generate the one or more derivative clock signals 116 in a free-running mode when the module 102 enters reset. When the derivative clock functionality 114 in each module 102 is generating the derivative clock signals 116 in free-running mode, the derivative clock signals 116 are not necessarily aligned to the primary clock signal received on the clock input 110 of that module 102 or to the corresponding derivative clock signals 116 produced by the other module 102 in the self-checking pair 100. Each of the derivative clocks signals 116 in each module 102 has an associated reset signal 130 that the clock and reset functionality 108 is configured to assert when that module 102 enters reset. The reset signal 130 associated with each derivative clock signal 116 is provided to the other functionality (for example, the application-specific functionality 101) that uses that derivative clock 116 in order to indicate to that functionality that the module 102 has entered reset and that the derivative clock signal 116 may not be aligned to the primary clock signal or to the corresponding derivative clock signals 116 produced by the other module 102 in the self-checking pair 100.

Also, when a parent reset signal is asserted, the clock and reset functionality 108 asynchronously asserts a reset signal on its local reset output 128. The reset signal is asserted "asynchronously" in that it is asserted immediately on its local reset output 128 and is not clocked. In this way, each module 102 is able to indicate to the other module 102 that it has entered, and remains in, reset.

The clock and reset functionality 108 in each module 102 is configured to support synchronous resets of the derivative clock signals 116. That is, each module 102 of the self-checking pair 100 is configured to exit reset at the same time as the other module 102 and, when it exits reset, each derivative clock signal 116 it generates is synchronized to the corresponding derivative clock signal 116 generated by the other module 102. The clock and reset functionality 108 in each of the modules 102 is configured to determine when the previously asserted parent reset signal has been negated (that is, is no longer asserted). When this happens, the clock and reset functionality 108 synchronously in each module 102 negates the reset signal that was asserted on the local reset output 128 of that module 102. The reset signal is "synchronously" negated in that the negated signal is clocked out on the local reset output 128 of the module 102 using the primary clock signal received on the clock signal input 110. In this way, each module 102 is able to indicate to the other module 102 that it is ready to exit reset.

Also, when the previously asserted parent reset signal has been negated, the clock and reset functionality 108 causes the clock and reset functionality 108 to begin synchronizing the module 102 to the primary clock signal received on the module's clock input 110. However, the derivative clock functionality 114 does not negate its derivative reset signals 130 nor exit free-running mode unless and until the other module 102 has indicated that it is ready to exit reset. As noted above, each module 102 indicates that is ready to exit reset by negating its local reset output 128 (which is received on the local reset input 126 of the other module 102). When the other module 102 has negated its local reset output 128 (that is, has indicated that it is ready to exit reset), the reset functionality 114 negates its derivative reset signals 130 and uses the primary clock signal to produce the derivative clock signals 116. In other words, each module 102 waits to exit reset until the other module 102 in the self-checking pair 100 has indicated that it is ready to exit reset.

In the embodiments described here, the clock and reset functionality 108 in each module 102 is configured to exit reset with the derivative clock signals 116 in a predetermined phase. Also, the clock and reset functionality 108 includes sufficient delay in order to account for the worst-case delay between the two modules 102 of the self-checking pair 100 exiting reset. This enables the modules 102 to synchronously exit reset without having to introduce additional delays to re-synchronize the derivative clock signals 116 in each of the modules 102 to one another and without losing correlation with the parent reset signal.

Figure 2:
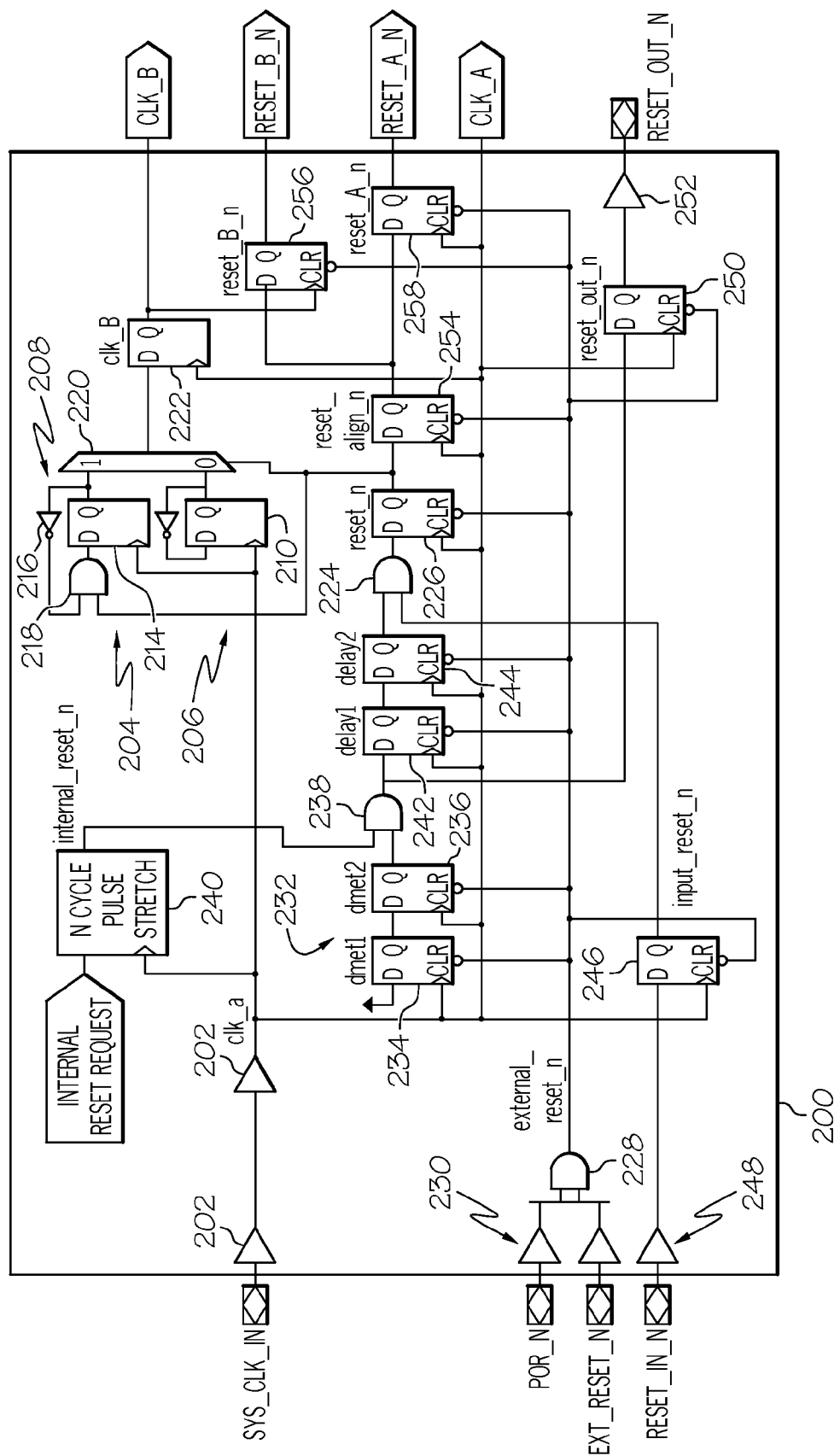
FIG. 2 is a block diagram of one exemplary embodiment of clock and reset functionality suitable for use in the self-checking pair of FIG. 1.

FIG. 2 is a block diagram of one exemplary embodiment of clock and reset functionality 200. The clock and reset functionality 200 shown in FIG. 2 is described here as being implemented in the self-checking pair 100 of FIG. 1, though it is to be understood that other embodiments can be implemented in other ways.

The primary clock signal (labeled "SYS_CLK_IN" in FIG. 2) is received on the clock input 110 and passes through a pair of buffers 202. The output of the last of the buffers 202 is also referred to here as the "clk_a" signal. The clk_a signal is output by the clock and reset functionality 200. Also, the clk_a signal is provided to the derivative clock functionality 114. The derivative clock functionality 114, in this embodiment, is implemented as a clock divider 204. The clock divider 204 shown in FIG. 2 is configured to divide the frequency of the parent clock signal in half in order to generate the derivative clock signal 116 (though in other embodiments and implementations, the derivative clock signal 116 is generated in other ways). In FIG. 2, the derivative clock signal 116 is labelled "clk_b".

In the embodiment shown in FIG. 2, the clock divider 204 is implementing using two clock divider circuits. A first clock divider circuit 206 is configured to generate the derivative clock signal clk_b in a free running mode when the module 102 is in reset, while a second clock divider circuit 208 is configured to generate the derivative clock signal clk_b when the module 102 is operating in lockstep with the other module 102 in the self-checking pair 100. The first clock divider circuit 206 includes a flip-flop 210 and an inverter 212, which are configured in a clock divider topology with the output ("Q") of the flip-flop 210 cross-coupled to its input ("D") via the inventor 212. The second clock divider circuit 208 includes a flip-flop 214 and an inverter 216, which are configured in a clock divider topology with the output ("Q") of the flip-flop 214 cross-coupled to its input ("D") via the inverter 216. However, the output of the inverter 216 is input to one of the inputs of an AND gate 218, the output of which is coupled to the input D of the flip-flop 214. The other input of the AND gate 218 is coupled to a reset signal ("reset_n" signal). In the following description, the "_N" or "_n" suffix indicates that a signal is asserted with a logical 0.

The clock divider 204 includes a multiplexer 220 which selects its output from one of the first and second clock divider circuits 206 and 208. The output of the multiplexer 220 is coupled to the input D of a flip-flop 222. The output Q of the flip-flop 222 is the derivative clock signal clk_b. The input signal that controls the multiplexer 220 is the reset_n signal.

When the reset_n signal is asserted (with a logical 0), the output of the first clock divider circuit 206 is supplied to the flip-flop 222. When the reset_n signal is negated (as described in more detail below), the output of the second clock divider circuit 206 is supplied to the flip-flop 222. The AND gate 218 is used to enable the second clock divider circuit 206 to generate an output clock signal having a known, predetermined phase. In this example, when the reset_n signal is asserted, the output of the AND gate 218 will always be a logical 0, regardless of the state of the other input. As a result, while the reset_n signal is asserted, the output D of the flip-flop 214 in the second clock divider 208 will be a logical 0 and the output of the inverter 216 will be a logical 1. Therefore, when the reset_n signal is negated (that is, transitions to a logical 1), both of the inputs to the AND gate 218 will be a logical 1 and, as a result, the value that is clocked out on the output Q of the flip-flop 214 will be a logical 1. In this way, the output of the second clock divider circuit 208 has a known, predetermined phase.

In general, the reset_n signal is asserted when any of the external, internal, or local reset signals has been asserted and is negated in lockstep with the other module 102 in the self-checking pair 100.

An AND gate 224 is used to produce the reset_n signal. One input of the AND gate 224 is coupled to a signal (also referred to here as the "delay2" signal) that is asserted when any of the external or internal reset signals have been asserted. Another input of the AND gate 224 is coupled to a signal (also referred to here as the "input_reset_n" signal) that is asserted when the local reset signal received on the local reset input 126 has been asserted. The output of the AND gate 224 is coupled to the input D of a flip-flop 226. The output Q of the flip-flop 226 is the reset_n signal. The flip-flop 226 is clocked using the clk_a signal produced from the parent clock signal. The flip-flop 226 has its clear input CLR connected to a signal that is asserted when any of the external reset signals are asserted. This signal is also referred to here as the "external_reset_n" signal. When the CLR input of the flip-flop 226 is asserted, the output Q of the flip-flop 226 is asynchronously cleared (that is, is set to a logical 0 without regard to the clock). In other words, when any of the external reset signals is asserted, the reset_n signal is asynchronously asserted.

The reset_n signal, which is the output Q of the flip-flop 226, is negated (that is, transitions to a logical 1) when the output of the AND gate 224 is a logical 1 and the CLR input of the flip-flop 226 is a logical 1. The output of the AND gate 224 will be a logical 1 if both of its inputs are a logical 1, which occurs when all of the external, internal, and local reset signals are negated. In other words, even if the parent reset signal that was asserted is negated, the reset_n signal is not negated until and unless the other module 102 indicates that it is ready to exit reset by negating its local reset output 128, which is received on the local reset input 126 of that module 102. The CLR input of the flip-flop 226 is a logical 1 when none of the external reset signals are asserted. The output Q of the flip-flop 226 is negated synchronously.

The delay2 signal is produced in the following way. The external reset inputs 118 (one of which is a power-on-reset (POR) reset input 120) are coupled to an AND gate 228 via respective buffers 230. A POR signal (labeled "POR_N" in FIG. 2) is received on the POR reset input 120, and another external reset signal (labeled "EXTERNAL_RESET_N" in FIG. 2) is received on the other external reset input 118. The signal output by the AND gate 228 is also referred to here as the "EXTERNAL_RESET_N" signal.

The clk_a signal produced from the primary clock signal is input to a metastability circuit 232 that includes first and second synchronization flip-flops 234 and 236. The metastability circuit 232 is used to guard against metastability resulting from the clk_a signal crossing into the clock domain of the module 102. The input D of the first flip-flop 234 is set at a constant logical 1 value. The output Q of the first flip-flop 234 is coupled to the input D of the second flip-flop 236. The first and second flip-flops 234 and 236 are clocked using the clk_a signal produced from the primary clock signal. The signal output by the first and second flip flops 234 and 236 are also referred to here as the "dmet1" signal and "dmet2" signal, respectively.

The output Q of the second synchronization flip-flop 236 (that is, the dmet2 signal) is input to an AND gate 238. The other input of the AND gate 238 is coupled to pulse stretch device 240. The pulse stretch device 240 is used to stretch an internal reset signal received from a source inside of the self-checking pair 100. The output of the pulse stretch device 240 is also referred to here as the "internal_reset_n" signal, which, when asserted, indicates that the self-checking pair 100 should enter reset. The pulse stretch device 240 stretches the internal reset signal for a number of clock cycles (N) that is sufficient to enable the internal reset signal to propagate through the clock and reset functionality 200 of both modules 102. The input of the pulse stretch device 240 is the internal reset signal. The pulse stretch device 240 is clocked by the clk_a signal produced from the parent clock signal.

The output of the AND gate 238 is delayed by a pair of delay flip-flops 242 and 244. More specifically, the output of the AND gate 238 is coupled to the input D of the first delay flip-flop 242 and the output Q of the first flip-flop 242 (also referred to here as the "delay1" signal) is coupled to the input D of the second flip-flop 244. The delay flip-flops 242 and 244 are clocked using the clk_a signal produced from the parent clock signal. The output Q of the second delay flip-flop 244 is the delay2 signal mentioned above, which is coupled to an input of the AND gate 224 used in generating the reset_n signal.

The input_reset_n signal (which is coupled to the other input of the AND gate 224 used in generating the reset_n signal) is generated in the following way. The local reset input 126 is coupled to an input D of a flip-flop 246 via buffer 248. The output of the flip-flip 246 is the input_reset_n signal. The flip-flop 246 is clocked using the clk_a signal.

The signal output on the local reset output 128 is generated in the following way. The output of the AND gate 238 is coupled to an input D of a flip-flop 250. The output Q of the flip-flop 250 is output on the local reset output 128 via a buffer 252. The flip-flop 250 is clocked using the clk_a signal. It is noted that the local reset output 128 is synchronously output.

A reset signal 130 associated with the derivative clock signal clk_b and a reset signal associated with the clk_a signal are generated in the following way. The reset signal 130 associated with the derivative clock signal clk_b is also referred to here in the context of FIG. 2 as the "reset_b_n" signal, and the reset signal associated with the clk_a signal is also referred to here in the context of FIG. 2 as the "reset_a" signal. The reset_n signal output by the flip-flop 226 is coupled to an input D of a flip-flop 254. The flip-flop 254 is used to provide a delay to better align the edges of the reset_n signal for use by the application-specific functionality 101. The output Q of the flip-flop 254 (also referred to here as the "reset_align_n" signal) is coupled to an input D of a flip-flop 256, the output Q of which is the reset signal reset_b_n for the derivative clock signal clk_b. The output Q of the flip-flop 254 is also coupled to an input D of a flip-flop 258, the output Q of which is the reset signal reset_a_n for the clk_a signal. The reset signals for the derivative clock signal clk_b and the clk_a signal are used by the application-specific functionality 101. The flips-flops 254 and 258 are clocked by the clk_a signal, while the flip-flop 256 is clocked by the derivative clock signal clk_b output by the clock divider 204 via the flip-flop 222.

In the embodiment shown in FIG. 2, all the flip-flops in the clock and reset functionality 200 except for the flip-flops 210 and 214 in the clock divider 204 and the flip-flop 222 used to output the derivative clock signal clk_b have their CLR inputs coupled to the external_reset_n signal, which is asserted when any of the external reset signals are asserted. When the external_reset_n signal is asserted, the CLR inputs of these flip-flops are asserted and the outputs Q of the flip-flops are asynchronously cleared (that is, is set to a logical 0 without regard to the clock).

The operation of the clock and reset functionality 200 shown in FIG. 2 is illustrated in the timing diagrams shown in FIGS. 3A-3D. The particular usage scenarios shown in FIGS. 3A-3D are exemplary only and it is to be understood that the clock and reset functionality 200 can be used in various ways.

In each timing diagram, the signals associated with a first one of the modules 102 in the self-checking pair 100 is shown in the upper timing diagram (that module 102 also being referred to here in the context of FIGS. 3A-3D as the "upper" module 102) while the signals associated with the other one of the modules 102 in the self-checking pair 100 is shown in the lower timing diagram (that module 102 also being referred to here in the context of FIGS. 3A-3D as the "lower" module 102).

Figure 3A:
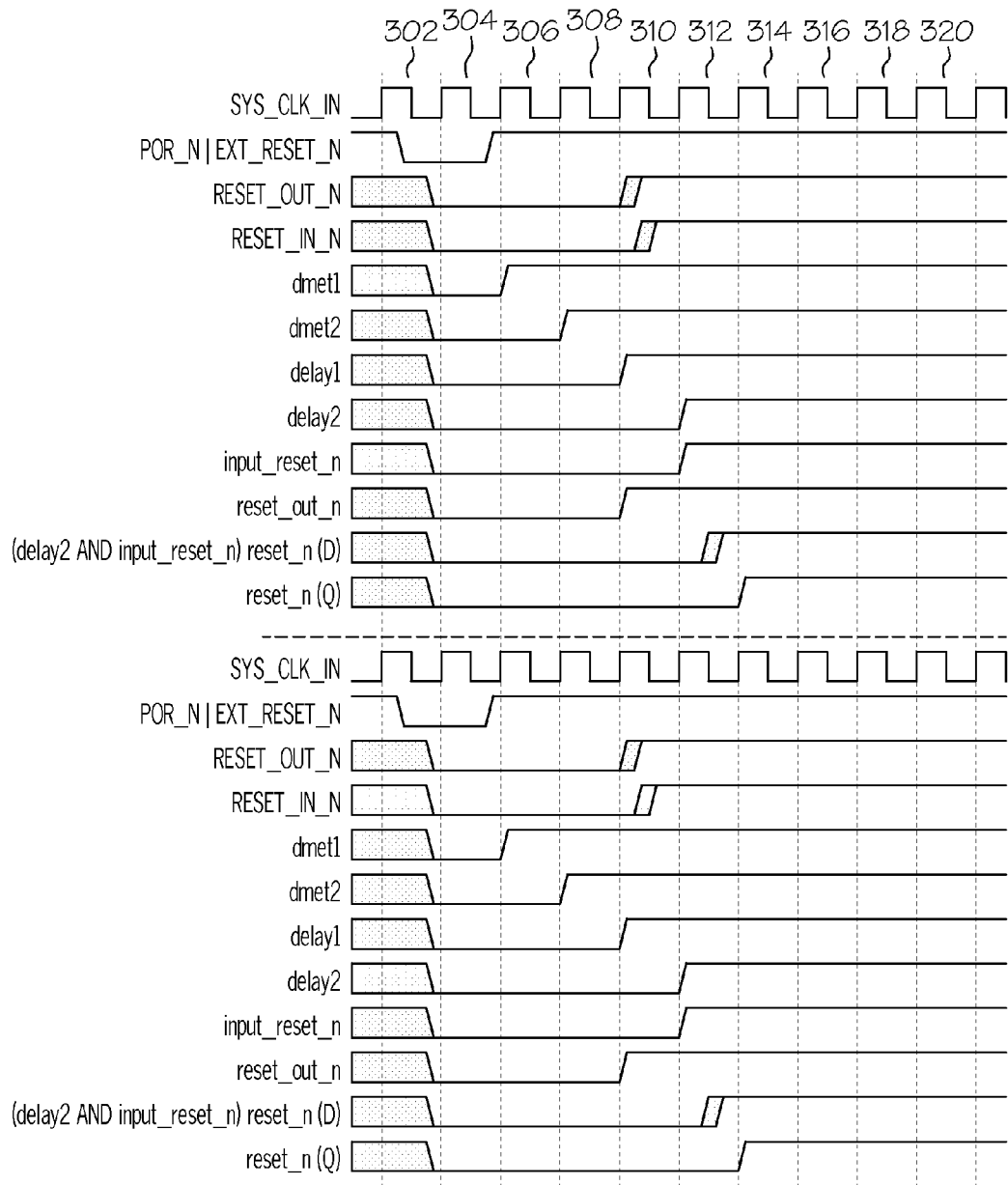
FIGS. 3A-3D are timing diagrams for the clock and reset functionality of FIG. 2.

In the timing diagram shown in FIG. 3A, both modules 102 operate in a "normal" fault-free manner and their signal timing diagrams are essentially the same. In this example, either the POR reset signal or other external reset signal is asserted during clock cycle 302, which causes the external_reset_n signal for each module 102 to go to a logical 0. As a result, the flip-flops in each module 102 that have their CLR inputs coupled to the external_reset_n signal are asynchronously cleared during clock cycle 302 (the RESET_OUT_N signal, dmet1 signal, dmet2 signal, delay1 signal, delay2 signal, input_reset_n signal, reset_out_n signal, (delay2 and input_reset_n) reset_n, and reset_n).

In this example, the POR reset signal or other external reset signal that was previously asserted is negated during clock cycle 304, which causes the external_reset_n signal in each module 102 to go to a logical 1. As a result, the flip-flops in each module 102 that have their CLR inputs coupled to the external_reset_n signal are no longer cleared. At the leading edge of clock cycle 306, the logical 1 coupled to the input D of the flip-flop 234 is clocked out on its output Q (the dmet1 signal) and is received at the input D of flip-flop 236. At the leading edge of clock cycle 308, the logical 1 on the input D of flip-flop 236 is clocked out on its output Q (dmet2 signal). In the timing diagrams shown in FIGS. 3A-3D, the internal_reset_n signal for each module 102 is not asserted (that is, remains at a logical 1). Thus, when the logical 1 is clocked out on the output Q of the flip-flop 236 (the dmet2 signal), the AND gate 238 will output a logical 1, which is received at the input D of the flip-flop 242 and the input D of the flip-flop 250.

At the leading edge of clock cycle 310, the logical 1 received on the input D of flip-flop 242 is clocked out on its output Q (delay1 signal), which is received at the input D of the flip-flop 244. Also, at the leading edge of clock cycle 310, the logical 1 received on the input D of the flip-flop 250 is clocked out on its output Q (RESET_OUT_N signal), which is output to the other module 102 via the buffer 252 as the RESET_OUT_N signal. The RESET_OUT_N signal output by each module 102 is received at the other module 102 as the RESET_IN_N signal and provided to the input D of the flip-flop 246 via buffer 248.

At the leading edge of clock cycle 312, the logical 1 on the input D of flip-flop 244 is clocked out on its output Q (delay2 signal), which is received at one input of the AND gate 224. Also, at the leading edge of clock cycle 312, the logical 1 on the input D of flip-flop 246 is clocked out on its output Q (input_reset_n signal), which is received at the other input of the AND gate 224. When both the delay2 signal and input_reset_n signal go to a logical 1, a logical 1 is output by the AND gate 224 (shown in FIG. 3A as the "(delay2 and input_reset_n) reset_n (D)" signal). At the leading edge of clock cycle 314, the logical 1 on the input D of flip-flop 226 is clocked out on its output Q (reset_n signal), which causes the module 102 to exit reset as described above.

The timing diagram 300 shown in FIG. 3A illustrates how each module 102 asynchronously enters reset but synchronously exits reset by having each module 102 wait until the other module 102 is ready to exit reset. In this way, the modules 102 will be able to exit reset with their parent and derivative clock signals synchronized. As a result, the modules 102 need not exchange derivative clock and reset signals.

Figure 3B:
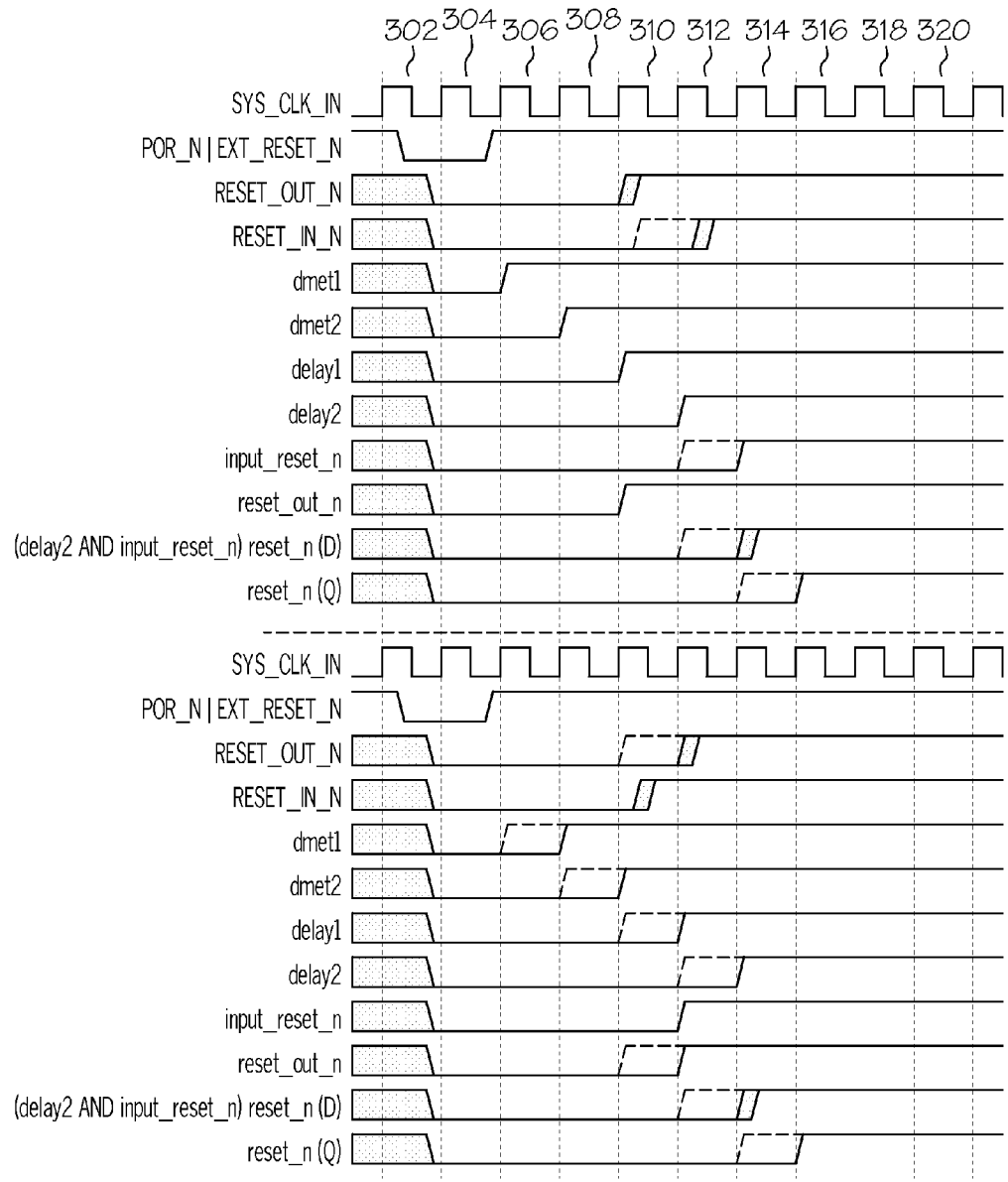

The timing diagram shown in FIG. 3B illustrates a scenario similar to the one shown in FIG. 3A except for the fact that, in the lower module 102, the first synchronization flip-flop 234 clocks the constant logical 1 coupled to its input D out on its output Q (dmet1 signal) one clock cycle later than the corresponding flip-flop 234 in the upper module 102. In FIG. 3B, dashed lines show the relevant signal as it exists in the scenario of FIG. 3A for the purposes of comparison. As a result, the dmet2, delay1, delay2, and RESET_OUT_N signals all transition to a logical 1 one clock cycle later than the corresponding signals in the upper module 102 associated with the upper timing diagram shown in FIG. 3B. Nevertheless, both modules 102 will exit reset at the same time since the RESET_OUT_N signal output by the lower module 102 is the RESET_IN_N signal of the upper module 102. As a result, the RESET_IN_N signal for the upper module 102 will be negated (that is, transition to a logical 1) one clock cycle later than was the case with FIG. 3A. Consequently, the input_reset_n signal for the upper module 102 will also be negated one clock cycle later than was the case with FIG. 3A.

As shown in FIG. 3B, the (delay2 and input_reset_n) reset n (D) signal and reset_n signal for both the upper and lower modules 102 both transition to a logical 1 one clock cycle later than was the case in FIG. 3A. Thus, even though the first synchronization flip-flop 234 in the lower module 102 was delayed in clocking through the logical 1 coupled to its input D by one clock cycle relative to the first synchronization flip-flop 234 in the upper module, the reset_n signal is negated on the same clock cycle in both modules 102. As noted above, the reset_n signal is used internally within each module 102 to determine when to have the clock divider 204 exit reset (that is, switch away from free-running mode) and to generate the reset signals for the derivative clock signal 116.

Figure 3C:
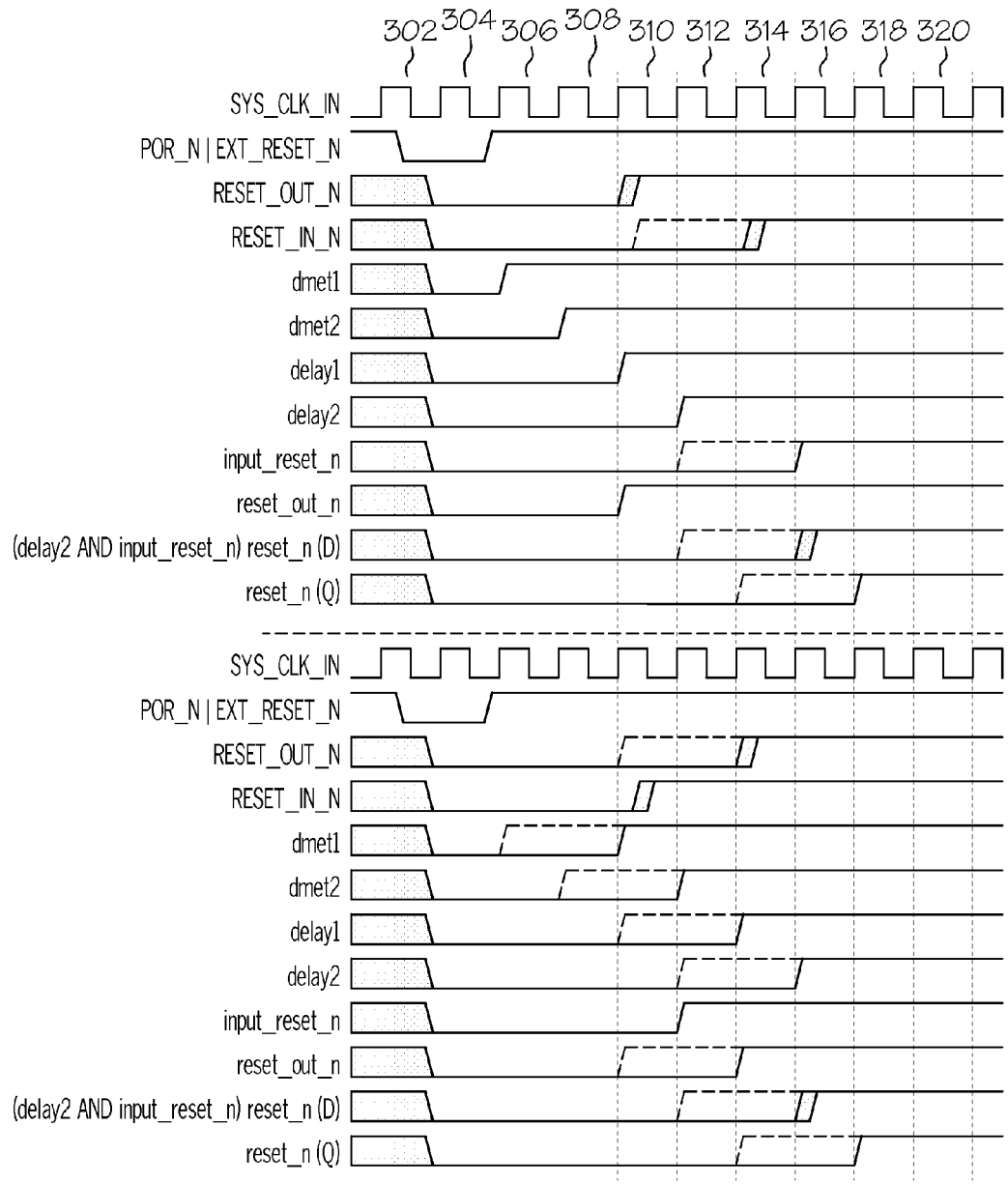

The timing diagrams shown in FIG. 3C illustrates a scenario similar to the one shown in FIG. 3B except for the fact that, in the lower module 102, the first synchronization flip-flop 234 clocks the constant logical 1 coupled to its input D out on its output Q (dmet1 signal) two clock cycles later than the corresponding flip-flop 234 in the upper module 102. In FIG. 3C, dashed lines show the relevant signal as it exists in the scenario of FIG. 3A for the purposes of comparison. The changes in signal timing are similar to those described above in connection with FIG. 3B except that the delays are two clock cycles, instead of one clock cycle.

Figure 3D:
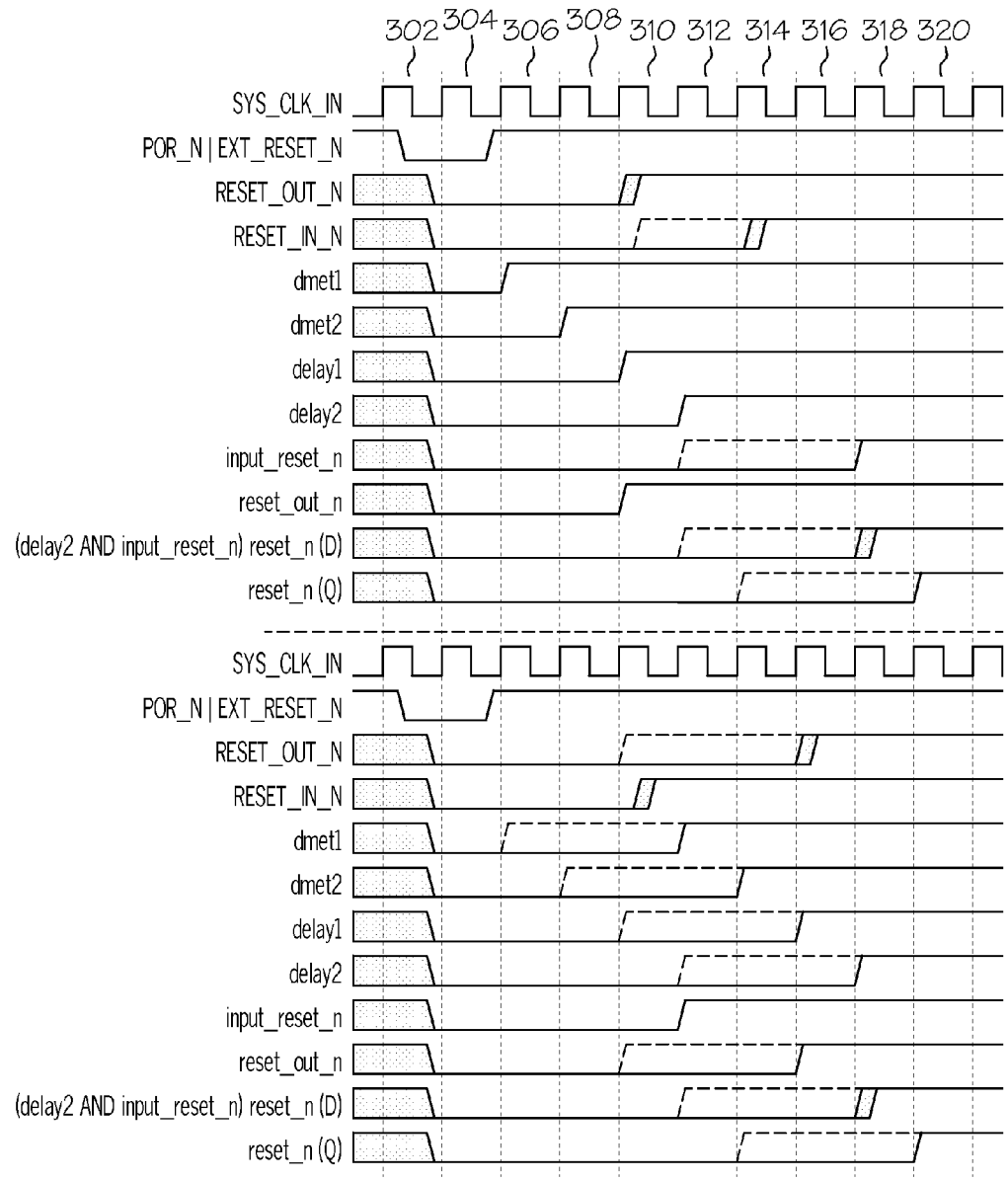

The timing diagrams shown in FIG. 3D illustrates a scenario similar to the one shown in FIG. 3B except for the fact that, in the lower module 102, the first synchronization flip-flop 234 clocks the constant logical 1 coupled to its input D out on its output Q (dmet1 signal) three clock cycles later than the corresponding flip-flop 234 in the upper module 102. In FIG. 3D, dashed lines show the relevant signal as it exists in the scenario of FIG. 3A for the purposes of comparison. The changes in signal timing are similar to those described above in connection with FIG. 3B except that the delays are three clock cycles, instead of one clock cycle.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. An apparatus comprising:
   first and second modules configured to operate in a lockstep mode and a reset mode;
   wherein each of the first and second modules is configured to asynchronously enter the reset mode when a parent reset signal is asserted at the respective each module;
   wherein each of the first and second modules is configured to, in response to the asserted parent reset signal being negated at the respective each module, indicate to the respective other module that the respective each module is ready to exit the reset mode and exit the reset mode when the respective other module has also indicated that the respective other module is ready to exit the reset mode.

2. The apparatus of claim 1, wherein each of the first and second modules comprises respective application-specific functionality that uses a respective derivative clock signal generated from a parent clock signal.

3. The apparatus of claim 2, wherein each of the first and second modules further comprises clock and reset functionality that generates the respective derivative clock signal from the parent clock signal;
   wherein the respective clock and reset functionality in each of the first and second modules, when the respective each module is operating in lockstep mode, aligns the respective derivative clock signal to the parent clock signal and to the respective derivative clock signal used in the respective other module; and
   wherein the respective clock and reset functionality in each of the first and second modules is configured to operate in a free-running mode when the respective each module is in the reset mode.

4. The apparatus of claim 1, wherein the first and second modules each comprise a local reset input and a local reset output, wherein the local reset output of the first module is coupled to the local reset input of the second module and the local reset output of the second module is coupled to the local reset input of the first module; and
   wherein each of the first and second modules indicate to the respective other module that the respective each module has entered the reset mode by asserting a signal on the respective local reset output of the respective each module and indicates to the respective other module that the respective each module is ready to exit the reset mode be negating the signal asserted on the respective local reset output of the respective each module; and
   wherein each of the first and second modules determines that the respective other module is ready to exit the reset mode based on the state of the local reset input of the respective each module.

5. The apparatus of claim 1, wherein the first and second modules are part of a self-checking pair.

6. The apparatus of claim 5, wherein each of the first and second modules comprises one of a command module and a monitor module.

7. The apparatus of claim 1, wherein each of the first and second modules comprises at least one of an application-specific integrated circuit, a microprocessor, a programmable device, a computer, a network interface, a bus guardian, a node, an electronic circuit, an electronic module, an electronic card, and an electronic assembly.

8. The apparatus of claim 1, wherein each of the first and second modules comprises respective clock and reset functionality that includes:
   means for asynchronously entering the reset mode when a parent reset signal is asserted at the respective each module; and
   means for, in response to the asserted parent reset signal being negated at the respective each module, indicating to the respective other module that the respective each module is ready to exit the reset mode and exiting the reset mode when the respective other module has also indicated that the respective other module is ready to exit the reset mode.

9. A first module comprising:
   application-specific functionality;
   clock and reset functionality configured to selectively cause the first module to operate in a lockstep mode in which the first module operates in lockstep with a second module and to selectively cause the first module to operate in a reset mode;

wherein the clock and reset functionality is configured to cause the first module to asynchronously enter the reset mode when a parent reset signal is asserted at the first module;

wherein the clock and reset functionality is configured to cause the first module, in response to the asserted parent reset signal being negated at the first module, to indicate to the second module that the first module is ready to exit the reset mode and to exit the reset mode when the second module has also indicated that the second module is ready to exit the reset mode.

10. The first module of claim 9, wherein the application-specific functionality uses a derivative clock signal generated from a parent clock signal.

11. The first module of claim 10, wherein the clock and reset functionality generates the derivative clock signal from the parent clock signal;

wherein the clock and reset functionality, when the first module is operating in lockstep mode, aligns the derivative clock signal to the parent clock signal and to a respective derivative clock signal used in the second module; and wherein the clock and reset functionality in the first module is configured to operate in a free-running mode when the first module is in the reset mode.

12. The first module of claim 9, wherein the first and second modules each comprise a local reset input and a local reset output, wherein the local reset output of the first module is coupled to the local reset input of the second module and the local reset output of the second module is coupled to the local reset input of the first module; and wherein each of the first and second modules indicate to the respective other module that the respective each module has entered the reset mode by asserting a signal on the respective local reset output of the respective each module and indicates to the respective other module that the respective each module is ready to exit the reset mode be negating the signal asserted on the respective local reset output of the respective each module; and wherein each of the first and second modules determines that the respective other module is ready to exit the reset mode based on the state of the local reset input of the respective each module.

13. The first module of claim 9, wherein the first and second modules are part of a self-checking pair.

14. The first module of claim 13, wherein the first module comprises at least one of a command module and a monitor module.

15. The first module of claim 9, wherein the first module comprises at least one of an application-specific integrated circuit, a microprocessor, a programmable device, a computer, a network interface, a bus guardian, a node, an electronic circuit, an electronic module, an electronic card, and an electronic assembly.

16. A method of resetting first and second modules that are configured to selectively operate in a lockstep mode and a reset mode, the method comprising:

at each of the first and second modules:

asynchronously entering the reset mode when a parent reset signal is asserted at the respective each module; and in response to the asserted parent reset signal being negated at the respective each module, indicating to the respective other module that the respective each module is ready to exit the reset mode and exiting the reset mode when the respective other module has also indicated that the respective other module is ready to exit the reset mode.

17. The method of claim 16, wherein each of the first and second modules comprises respective application-specific functionality that uses a respective derivative clock signal; and wherein the method further comprises:

at each of the first and second modules:

generating the respective derivative clock signal from the parent clock signal;

when the respective each module is operating in lockstep mode, aligning the respective derivative clock signal to the parent clock signal and to the respective derivative clock signal used in the respective other module; and generating the respective derivative clock signal in a free-running mode when the respective each module is in the reset mode.

18. The method of claim 16, wherein the first and second modules each comprise a local reset input and a local reset output, wherein the local reset output of the first module is coupled to the local reset input of the second module and the local reset output of the second module is coupled to the local reset input of the first module; and at each of the first and second modules, indicating to the respective other module that the respective each module has entered the reset mode comprises asserting a signal on the respective local reset output of the respective each module and indicating to the respective other module that the respective each module is ready to exit the reset mode comprises negating the signal asserted on the respective local reset output of the respective each module; and wherein each of the first and second modules determines that the respective other module is ready to exit the reset mode based on the state of the local reset input of the respective each module.

19. The method of claim 16, wherein the first and second modules are part of a self-checking pair.

20. The method of claim 16, wherein each of the first and second modules comprises at least one of an application-specific integrated circuit, a microprocessor, a programmable device, a computer, a network interface, a bus guardian, a node, an electronic circuit, an electronic module, an electronic card, and an electronic assembly.

* * * * *